(No Model.)
B. J. HOWE.
Dish Washer.
No. 229,413.  Patented June 29, 1880.
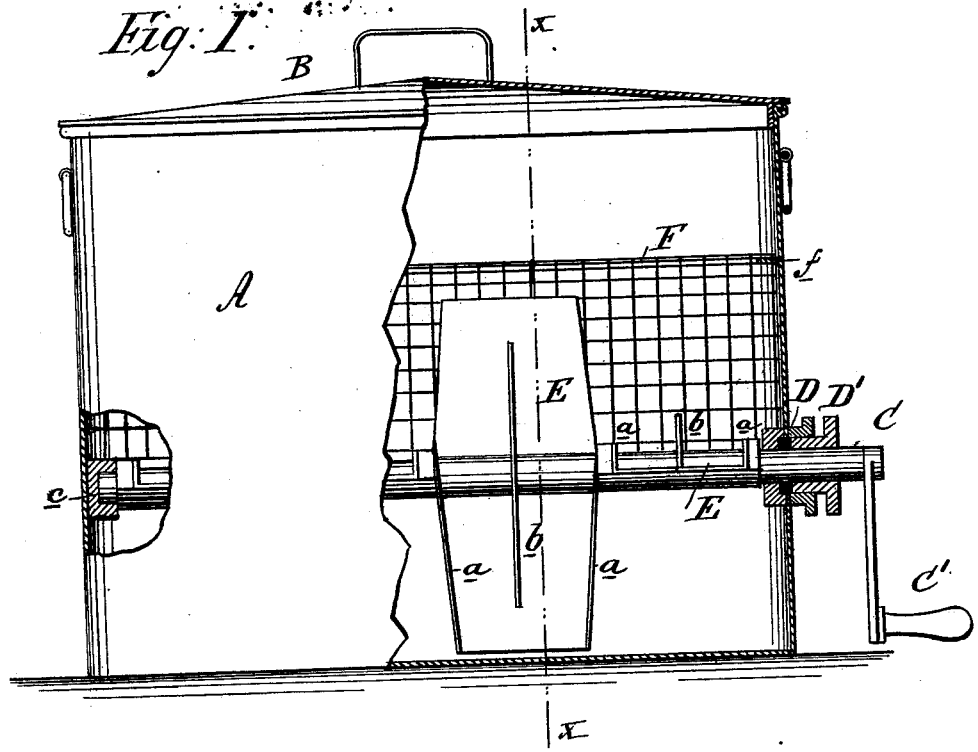
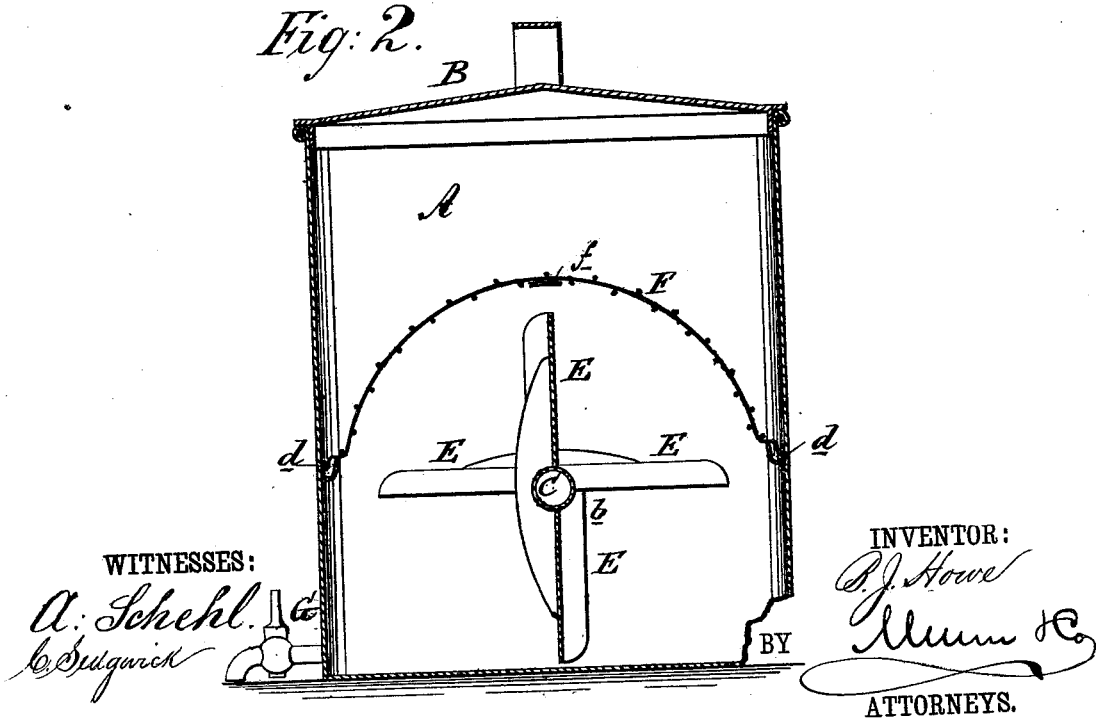
WITNESSES:
A. Schehl.
C. Sedgwick
INVENTOR:
B. J. Howe
BY Munn &Co
ATTORNEYS.

UNITED STATES PATENT OFFICE.

BENJAMIN J. HOWE, OF SING SING, NEW YORK.

DISH-WASHER.

SPECIFICATION forming part of Letters Patent No. 229,413, dated June 29, 1880.

Application filed April 1, 1880. (No model.)

*To all whom it may concern:*

Be it known that I, BENJAMIN J. HOWE, of Sing Sing, in the county of Westchester and State of New York, have invented a new and Improved Dish-Washer, of which the following is a specification.

The object of this invention is to provide a device for the rapid and thorough washing of dishes.

Figure 1 is a side elevation of the washer, partly in section, and with parts broken away to exhibit other parts. Fig. 2 is a sectional end elevation of the same on line $x$ $x$, Fig. 1.

Similar letters of reference indicate corresponding parts.

In the drawings, A represents the vessel, preferably of elliptical shape, and made of tin or galvanized iron. B is the cover of the vessel. C is the shaft passing through the longitudinal axis of the said vessel A, and supported in suitable bearings, the inner end of the said shaft being supported on the bearing $c$ within the vessel A, while the other end extends through the stuffing-box D, that is fixed in the opposite end of the said vessel. D' is a gland that fits around the outer end of the shaft C, and screws in upon the packing of the stuffing-box D to form a water-tight joint. E E are the fans or radial paddles that are keyed or otherwise secured to the shaft E within the vessel A. These radial paddles decrease in width from the shaft outwardly, and are provided with raised edges $a$ on both sides and longitudinal central ribs, $b$, that serve to stiffen and strengthen the said paddles E E and cause them to lift and throw more water.

F is the semi-cylindrical grating supported on the side lugs, $d$ $d$, and end lugs, $f$ $f$, within the vessel A, the said grating being arched laterally from side to side over the paddles or fans E E, and being preferably made of stout wire-netting. G is the cock to draw off the water from the said vessel A.

To operate the device, the water, preferably hot, or hot soap-suds, is placed within the vessel A so as to reach nearly up to the shaft C. The dishes to be cleansed are then placed upon the grating F, and the operator then, taking hold of the crank C', revolves the fans E E in either direction, and thereby dashes hot water or suds violently upon the said dishes and quickly and thoroughly cleanses them.

The grease and other matters that are washed from the said dishes fall into the water below and are drawn off by the cock G. The cover B prevents any of the water from being thrown out of the vessel A.

On taking off the cover the dishes may be quickly removed and others be introduced in their places.

By this device it is found that as many dishes can be washed and as thoroughly cleansed in five minutes as can be done by hand by one operator in an hour. It is found also that the risk of breakage is very materially lessened by the use of this device.

Having thus fully described my invention, I claim as new and desire to secure by Letters Patent—

In a dish-washer, the combination, with the covered vessel B A, of the radial paddles E, decreasing in width from the shaft outwardly, having raised edges $a$ on both sides and long central ribs, $b$, and the arched grating F, supported on side lugs, $d$, and end lugs, $f$, as shown and described.

BENJAMIN JEWETT HOWE.

Witnesses:
C. L. PHELPS,
JANE RYDER.